April 29, 1930. A. G. ESCASENA 1,756,021
ADVERTISEMENT
Filed March 20, 1929
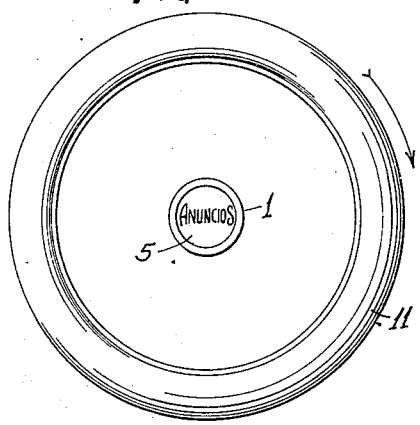
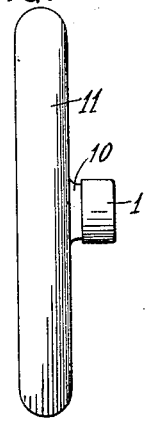
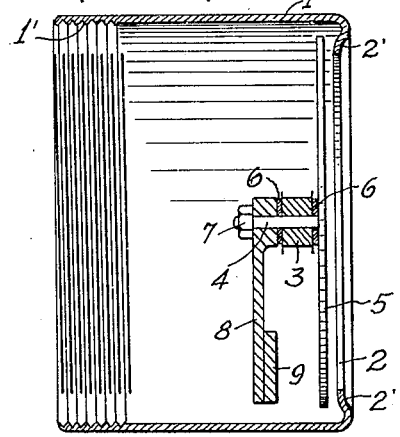
INVENTOR:
Antonio Grau Escasena
BY: Ruegs, Boyer+Bakelar
ATTORNEYS.

Patented Apr. 29, 1930

1,756,021

UNITED STATES PATENT OFFICE

ANTONIO GRAU ESCASENA, OF HABANA, CUBA

ADVERTISEMENT

Application filed March 20, 1929, Serial No. 348,387, and in Cuba March 7, 1929.

This invention refers to advertisements, and has for its main object the provision of a device, whereby the advertisements, signs, or other distinctive marks or figures placed on any revolving contrivance, may be clearly seen.

My invention is especially adaptable to the wheels of automobiles and other vehicles, on the hubs and bushing of which it is customary to place the trade mark of the manufacturer of the car. This trade mark, up to the present time, has not been visible, as natural, when the car is in motion, due to the revolving movement of the wheel, with which the hub also revolves.

I have provided a device, whereby said trade mark, or distinction remains substantially immovable during the travel of the car, and its details may be easily seen contributing thereby in obtaining a greater degree of popularity and credit for the trade mark in question.

In the drawings:

Figure 1 is a side elevation, in detail of a wheel which includes the device, the object of the present invention.

Figure 2, is a front elevation of said wheel.

Figure 3, is an upper plan view, on enlarged scale, and in detail, with sectioned parts, of the device, the object of the present invention, and Figure 4 is a vertical diametrical section, according to lines 4—4 of Figure 3.

The device comprises substantially a cylindrical casing 1 of an adequate diameter for adapting same to hub 10 of a wheel 11, one of its ends which is open, being threaded for this purpose, as shown by 1'. On its other end said casing has a large circular opening 2 bordered by a flange 2 slightly curved inwardly.

Within the casing, towards the end which corresponds to the opening 2, is a diametrical brace 3, fastened on its ends to the sides of the casing, and having in its central part an opening through which loosely passes a short shaft 4, having engaged on its forward end which projects out from the brace 3, a disk 5, visible through the opening 2 and said disk having on its outer surface a trade mark, advertisement or distinctive sign, a spacing washer 6 being placed between said disk and the brace 3. To the other end of the shaft 4, which extends into the casing 1, is fastened a hanging arm 8, held in position by a nut 7, which is screwed to this end of the shaft 4, a second washer 6 being disposed between the brace 3 and the arm 8. To the lower end of said arm is fastened a counterweight 9, the weight of which is equal to that of the disk 5.

As may be clearly observed, the casing (one) 1, being screwed, or fastened in any other way to the hub 10 of a wheel 11, as seen in Figures 1 and 2, when this wheel turns during the travel, the disk 5, due to its loose mounting, with relation to the casing 1, will not revolve with same, but will be held in an immovable position by the action of the counterweight 9, which is equal to the weight of the disk 5, thereby obtaining a perfect equilibrium of the two parts. In this way any letters, marks or distinctive signs, on the outer surface of the disk 5 will be easily seen during the travel of the vehicle.

Claims:

1. In advertisements, the arrangement of a casing engageable in one of its ends to the hub of a wheel, and having openings in its opposite ends, through one of which are visible insignia which are contained on the corresponding surface of a disk fastened to a shaft mounted loosely with relation to the casing; and a counterweight secured to the shaft.

2. In advertisements, the arrangement of a casing engageable in one of its ends to the hub of a wheel; said casing having on its other end an opening; a shaft mounted loosely through a support embodied with the casing and within same; a disk secured to the shaft and having on its outer surface insignia visible through the opening of the casing, and an arm secured to the shaft, bearing a counterweight, the weight of which is equal to that of the disk.

In testimony whereof I have signed my name to this specification.

ANTONIO GRAU ESCASENA.